United States Patent [19]

Yoshinaka et al.

[11] Patent Number: 4,987,579

[45] Date of Patent: Jan. 22, 1991

[54] ELECTRONIC CLINICAL THERMOMETER

[75] Inventors: Yasuhiro Yoshinaka; Yutaka Muramoto, both of Fuji, Japan

[73] Assignee: Terumo Kabushiki Kaisha, Tokyo, Japan

[21] Appl. No.: 362,451

[22] PCT Filed: Nov. 26, 1987

[86] PCT No.: PCT/JP87/00915

§ 371 Date: May 24, 1989

§ 102(e) Date: May 24, 1989

[87] PCT Pub. No.: WO88/04040

PCT Pub. Date: Jun. 2, 1988

[30] Foreign Application Priority Data

Nov. 26, 1986 [JP] Japan ................. 61-279693
Nov. 26, 1986 [JP] Japan ................. 61-279694
Nov. 26, 1986 [JP] Japan ................. 61-279695

[51] Int. Cl.$^5$ .......................... G01K 7/22; A61B 5/00
[52] U.S. Cl. ................................. 377/25; 374/208; 340/573
[58] Field of Search ............... 377/25; 374/183, 185, 374/208, 209; 340/573

[56] References Cited

U.S. PATENT DOCUMENTS

| | | | |
|---|---|---|---|
| 3,960,138 | 6/1976 | Doss et al. | 340/573 |
| 4,090,064 | 5/1978 | Turner | 377/25 |
| 4,551,031 | 11/1985 | Ishikawa et al. | 377/25 |
| 4,642,785 | 2/1987 | Packard et al. | 377/25 |
| 4,658,407 | 4/1987 | Iwama | 377/25 |

FOREIGN PATENT DOCUMENTS

| | | | |
|---|---|---|---|
| 0154025 | 9/1982 | Japan | 377/25 |
| 0171107 | 11/1983 | Japan | 377/25 |
| 0225533 | 11/1985 | Japan | 377/25 |

Primary Examiner—John S. Heyman
Attorney, Agent, or Firm—Staas & Halsey

[57] ABSTRACT

Disclosed is an electronic clinical thermometer at least the temperature sensing portion of which, or the entire thermometer, has a flexible structure which adapts itself to any part of a body surface for automatically measuring body temperature or body surface temperature over an extended period of time. Preferably, the thermometer includes a power supply battery and a temperature measuring and storing circuit for storing in memory temperature data obtained by sensing temperature at a predetermined period by means of a temperature-responsive portion, reading out the temperature data stored in the memory in response to an externally applied data-read request, and outputting the temperature data to an external unit from a prescribed signal extracting portion. These elements are mounted on a flexible circuit board. The entirety of the electronic clinical thermometer, with the exception of the temperature-responsive portion and the signal extracting portion, is sealed and covered by a flexible, heat-insulative covering member.

6 Claims, 8 Drawing Sheets

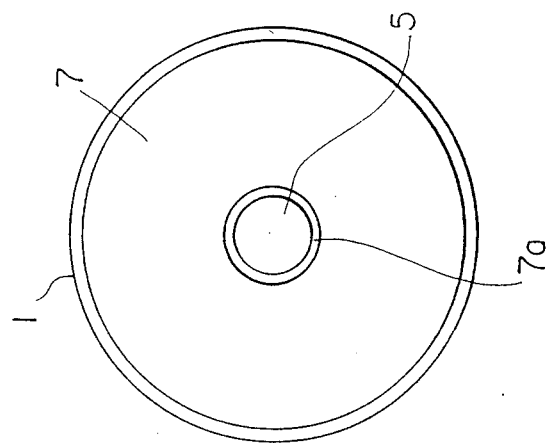
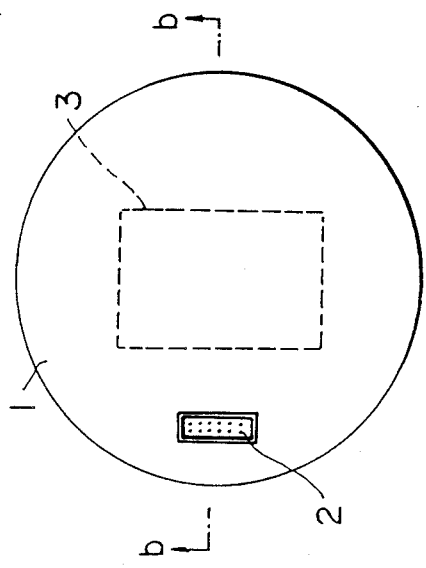
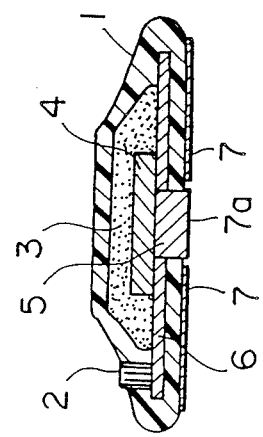
FIG. 1 (C)
FIG. 1 (A)
FIG. 1 (B)

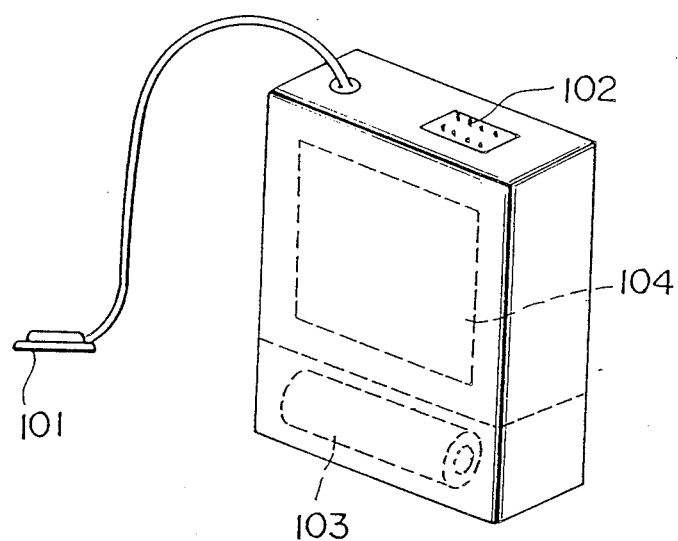
F I G. 7 (A)
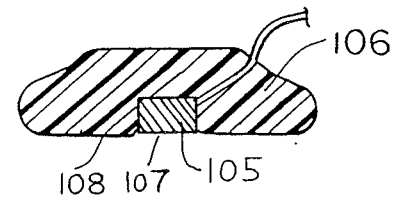
F I G. 7 (B)

ELECTRONIC CLINICAL THERMOMETER

BACKGROUND OF THE INVENTION

1. Field of the Invention

This invention relates to an electronic clinical thermometer and, more particularly, to an electronic clinical thermometer in which at least the temperature sensing portion or the entire thermometer has a flexible structure which adapts itself to any part of a body surface for automatically measuring body temperature or body surface temperature over an extended period of time.

2. Description of the Related Art

The temperature sensing portion of conventional electronic clinical thermometers has a solid, rod-shaped form and is fixedly inserted into a specific part of the body, such as the armpit, rectum or mouth, to measure temperature. Accordingly, the temperature sensing portion or the entire thermometer lacks a flexible structure, so that the body cannot move freely while its temperature is being measured. In a case where a part of the body other than those mentioned above, such as the surface of the body, is to have its temperature measured, it is extremely difficult to affix the temperature sensing portion to the body surface owing to its shape.

Further, the conventional electronic clinical thermometer is such that the results of body temperature measurement are successively displayed by a display element such as a liquid-crystal cell. This means that if a change in body temperature over a given day is to be measured, it is necessary to repeatedly observe the displayed temperature and record it. Such a thermometer is troublesome to handle and involves considerable risk of error as far as recording the temperature is concerned.

SUMMARY OF THE INVENTION

The present invention has been devised to eliminate the aforementioned drawbacks of the prior art and its object is to provide an electronic clinical thermometer at least the temperature sensing portion of which, or the entire thermometer, has a flexible structure which adapts itself to any part of a body surface.

Another object of the present invention is to provide an electronic clinical thermometer having a compact, flexible structure which adapts itself to a body surface, and in which body temperature can be measured and recorded automatically over an extended period of time through a simple arrangement and operation.

In order to attain the foregoing objects, an electronic clinical thermometer according t the present invention has an electronic circuit which includes a temperature-responsive portion and a signal extracting portion, a flexible substrate mounting the electronic circuit, a flexible, heat-insulative covering member for sealing and covering the electronic circuit and flexible substrate with the exception of the temperature-responsive portion and signal extracting portion, and affixing means provided on the periphery of the heat-responsive element at an outer surface of the covering member.

Further, in order to attain the foregoing objects, an electronic clinical thermometer according to the present invention has an electronic circuit comprising a temperature-responsive portion and a signal extracting portion, a flexible substrate mounting the electronic circuit, and a flexible, heat-insulative covering member for sealing and covering the electronic circuit and flexible substrate with the exception of the temperature-responsive portion and signal extracting portion, wherein the electronic circuit has temperature sensing means for sensing temperature by the temperature-responsive portion, a memory for storing a plurality of items of data, counter means for cyclically addressing the memory from a O address to an N address, measurement control means for detecting temperature at a predetermined period by the temperature sensing means, successively storing the sensed temperature data in the memory, and stopping storing of temperature data in response to designation of the N address by the counter means, and read-out means for successively outputting the data of the memory to a signal extracting portion in response to a read-out signal form the signal extracting portion.

In a preferred embodiment, the signal extracting portion is constituted by a member through which a light signal is transmitted.

In a preferred embodiment, the signal extracting portion is constituted by a member for transmitting and receiving a radio signal.

In a preferred embodiment, an outer surface of the covering member is provided with affixing means for affixing the electronic clinical thermometer.

In a preferred embodiment, the electronic clinical thermometer has writing means for receiving a write signal and time data from the signal extracting portion and writing said time data in a pertinent address of the memory.

BRIEF DESCRIPTION OF THE DRAWINGS

FIG. 1(A) is a top view of an electronic clinical thermometer of a first embodiment according to the present invention;

FIG. 1(B) is a sectional view taken along line b—b of FIG. 1(A);

FIG. 1(C) is a bottom view of the electronic clinical thermometer of the first embodiment according to the present invention;

FIG. 7(A) is an external perspective view of an electronic clinical thermometer of a third embodiment to the present invention; according FIG. 7(B) is a sectional view of a probe in FIG. 7(A);

DESCRIPTION OF THE PREFERRED EMBODIMENTS

Figure 2:
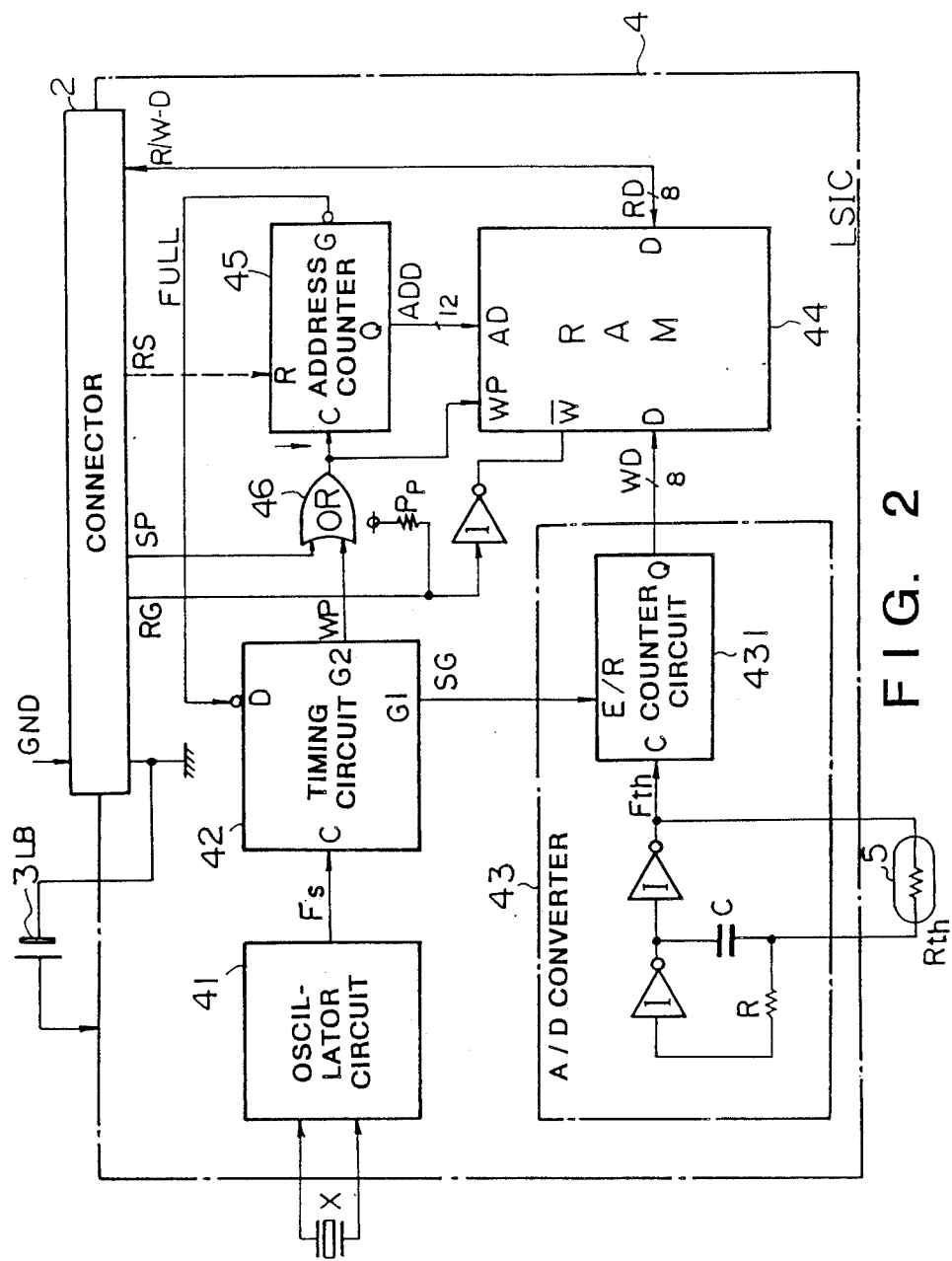
FIG. 2 is a block diagram of the electronic clinical thermometer of the first embodiment according to the present invention.

Embodiments according to the invention will now be described in detail with reference to the accompanying drawings.

First Embodiment

FIG. 1(A) is a top view of an electronic clinical thermometer of a first embodiment according to the present invention, FIG. 1(B) is a sectional view taken along line b—b of FIG. 1(A), and FIG. 1(C) is a bottom view of the electronic clinical thermometer of the first embodiment.

In the top view of FIG. 1(A), numeral 1 denotes a flexible, heat-insulative mounting member for mounting therein the electronic components of an electronic clinical thermometer to retain a flexible structure for the entirety of the thermometer. An example of a material which can be used as the mounting member is expanded urethane. Numeral 2 denotes a connector for externally extracting temperature data measured and accumulated by the electronic clinical thermometer. Numeral 3 designates a battery for the electronic clinical thermometer, which battery preferably is of the replaceable or chargeable type. A preferred example of a replaceable battery is a film-type lithium battery (LB).

In the sectional view of FIG. 1(B), numeral 4 denotes an LSIC(C-MOS) in which an electronic circuit, described below, is accommodated within a single chip. The LSIC(C-MOS) contains a temperature measuring circuit, a temperature data storing circuit, etc. Numeral 5 represents a chip thermistor whose. temperature-responsive resistance value $R_{th}$ varies in comformity with a change in temperature. Numeral 6 denotes a flexible substrate flexibly retaining the electronic components and electrically connected thereto. Examples of materials which can be used to form this flexible substrate are polyimide, polyester, polyparabanic acid, glass epoxy, etc. Numeral 7 designates a disposable-type double-sided tape (with adhesive surfaces) affixed directly to the skin of a body surface. The double-sided tape 7 makes it possible to affix the electronic clinical thermometer, the entire structure of which is flexible and which comprises the flexible substrate 6 and the covering member 1, to the body surface while the thermometer accommodates itself to the shape of the part desired to be measured.

In the bottom view of FIG. 1(C), the temperature-responsive portion of the chip thermistor 5 senses body temperature by being brought into contact with the body surface through an aperture 7a provided substantially at the central portion of the adhesive surface 7. At this time the heat-insulative mounting member 1 makes it possible to accurately measure the temperature of the body surface while it effectively insulates the chip thermistor 5 from the temperature outside. This electronic clinical thermometer can be manufactured in a variety of diameters taking into consideration the location where it is to be affixed, the handling of the connector 2, etc.

Figure 3:
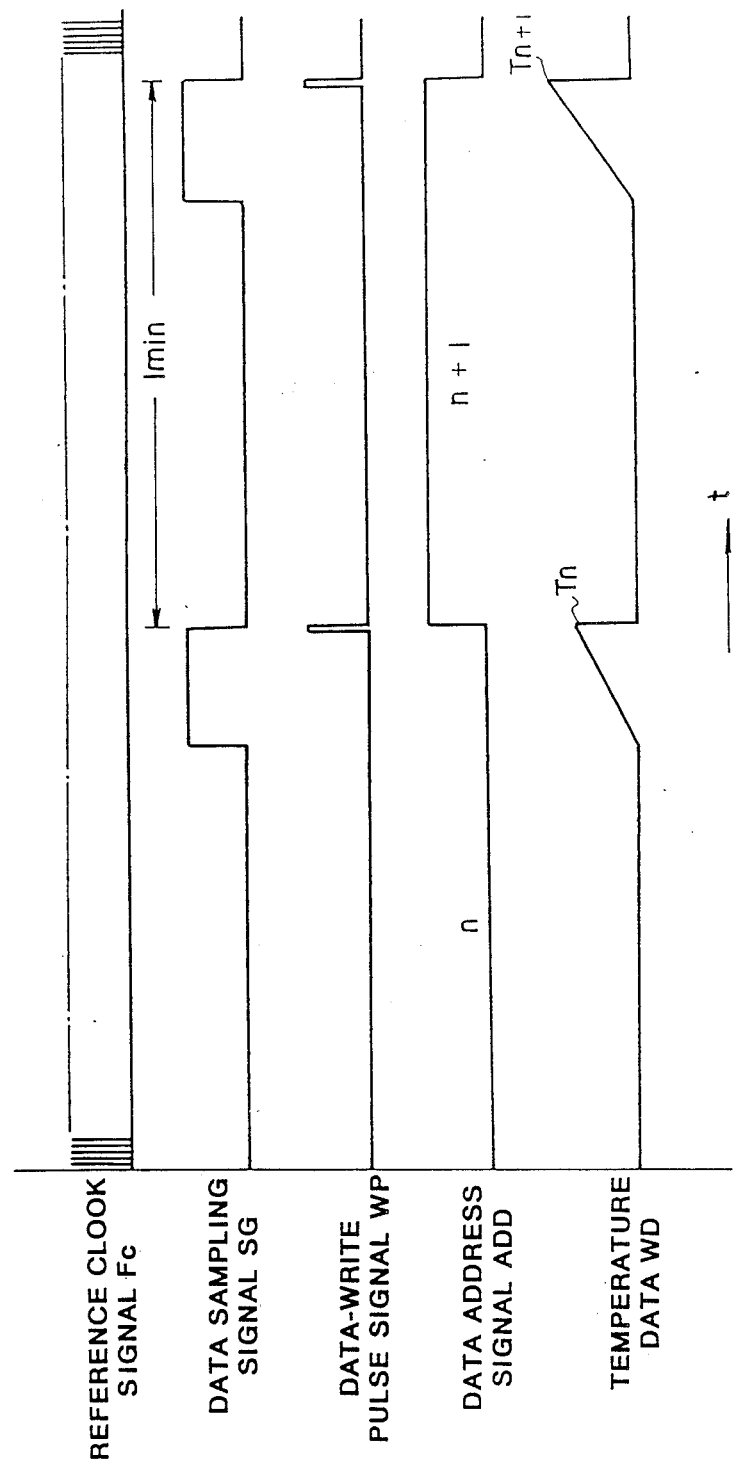
FIG. 3 is an operation timing chart of the electronic clinical thermometer of the first embodiment according to the present invention.

FIG. 2 is a block diagram of the electronic clinical thermometer of the first embodiment according to the present invention, and FIG. 3 is an operation timing chart thereof. Portions identical with those of FIGS. 1(A) through (C) are indicated by like reference characters and a description thereof is deleted. In the block diagram of FIG. 2, numeral 41 denotes an oscillator circuit for generating a reference clock signal Fs; X a quartz oscillator for stabilizing the oscillation frequency of the reference clock signal Fs; 42 a timing circuit for frequency-dividing the reference clock Fs and generating temperature data sampling signal SG and a data-write pulse signal WP for writing data in a memory; described below; 43 an A/D converter for detecting the temperature-responsive resistance value $R_{th}$ of the chip thermister 5 at the timing of each data sampling signal SG, and converting the result into temperature data WD for writing digital temperature; 44 a random-access memory (RAM) for storing measurement start-time data, entered whenever necessary from outside the electronic clinical thermometer, and for storing sampled items of temperature data WD up to a predetermined address, or a predetermined number of items of this data, after measurement starts; and 45 an address counter for controlling read/write addresses of the RAM 44.

Thus, the electronic clinical thermometer of the first embodiment is such that the entirety of the thermometer has a flexible structure so that the thermometer will adapt itself to any part of a body surface, as a result of which body temperature or body surface temperature can be measured automatically with ease and reliability over an extended period of time.

The operation of the electronic clinical thermometer of the first embodiment will now be described with reference to the timing chart of FIG. 3. When the lithium battery 3 is inserted into the electronic clinical thermometer, the oscillator circuit 41 begins oscillating and outputs the reference clock signal Fs having a reference frequency. The timing circuit 42 frequency-divides the reference clock signal Fs and outputs the data sampling signal SG, which has a predetermined pulse width, at a rate of once per minute, by way of example. In synchronization therewith, the timing circuit 42 outputs the data-write pulse signal WP of the temperature data WD. The temperature detecting circuit of the A/D converter 43 is a multivibrator circuit comprising a capacitor C, a resistor R, the chip thermistor 5 and an inverter circuitI. The multivibrator circuit has an oscillator clock frequency $F_{th}$ which varies in dependence upon a change in the temperature-responsive resistance value $R_{th}$ of chip thermistor 5, which is sensitive to body temperature. The frequency Ftn generally is given by $$F_{th} = K \times 1/(C\ R_{th})$$

The counter circuit 431 counts the reference clock signal Ftn of the multivibrator circuit for a length of time equivalent to the predetermined pulse width of the data sampling signal SG. Accordingly, the temperature data WD, which is proportional to the sensed temperature, is obtained from the counter circuit 431. The temperature data WD is written in the RAM 44 in accordance with a data address signal ADD (e.g., n) outputted by the address counter 45. The data-write pulse signal WP makes it possible to write the temperature data WD in the RAM 44 and, at the timing of its negative-going transition, increments the address counter 45. Thus, the items of temperature data WD are successively stored in the RAM 44. When the items of temperature data fill the RAM 44 (e.g., when the count ADD in the address counter 45 becomes a predetermined address N), the address counter 45 outputs a low-level gate signal FULL, which halts the data storing operation of the timing circuit 42. In this case, if it is assumed that the temperature data always start being stored from a "0" address, the gate signal FULL will halt the data storing operation when the RAM 44 has stored a predetermined number of items of the temperature data WD. In any case, this prevents destruction of previously stored data owing to recycling of the RAM 44 write address. Accordingly, after measurement starts, temperature data stored in the RAM 44 will not be lost until these temperature data are read out from outside the electronic clinical thermometer.

External data read-out is performed by connecting a prescribed cable to the connector 2. When a read gate signal RG applied externally via the connector 2 assumes the low level, the RAM 44 assumes the data read-out mode. At all other times the RAM 44 is held at a high level (data-write mode) by the action of a pull-up resistor $R_P$. A data bus line R/W-D connecting the connector 2 and the RAM 44 is joined to, say, an eight-bit bidirectional bus structure. When the RAM 44 is in the data read-out mode, the temperature data RD read out of the RAM 44 become effective on the bus line R/W-D. By way of example, if it is assumed that the address counter 45 has stopped operating at its maximum count N at the time of the immediately preceding data-write mode, then externally applying a dummy data-read pulse signal SP via the connector 2 will increment the address counter 45, so that the data address signal ADD will return to the "0" address. As a result, since the item of temperature data RD at address "0" will be outputted to the bus line R/W-D of connector 2, an external apparatus (not shown) will be capable of accepting this temperature data RD. Next, when the data-read pulse signal SP is externally applied, the item of temperature data RD of the "0" address is accepted, the address counter 45 is incremented at the trailing edge of the data-read pulse signal SP, and the data address signal ADD becomes a "1" address. The external apparatus transmits the next data-read pulse signal SP to accept this temperature data RD. It should be noted that the function for halting operation of the timing circuit 42 by the gate signal FULL is cancelled by application of the dummy data-read pulse signal SP. However, since the period of the actual data-read pulse signal SP can be made much shorter than the period of the data-write pulse signal WP, read-out of all temperature data can be concluded well before the first data-write pulse signal WP is subsequently generated. In response to final read-out of the stored temperature data, the gate signal FULL again assumes the low level, thereby halting operation of the timing circuit 42 to restore the initial conditions.

Preferably, the initial temperature data at the start of measurement should always be stored at the "0" address of RAM 44, and the temperature data prevailing a the end of measurement should be stored at the last address of the RAM 44. To this end, the gate signal FULL ordinarily is placed at the low level in a state where all temperature data RD have been read out. Then, when not in use, the electronic clinical thermometer is put aside in this state. In general, since a C-MOS-type IC chip consumes very little power when not operating, it is advantageous as far as the lithium battery 3 is concerned to put the electronic clinical thermometer aside in this state. Then, when the thermometer is used again at a later time, a cable is temporarily connected to the connector 2 and one dummy data-read pulse signal SP is applied, by way of example. As a result, temperature data subsequently sampled will be written in the RAM 44 starting from the "0" address. When the electronic clinical thermometer whose temperature data have been read out to an external apparatus is to be used immediately without being put aside, one extra data-read pulse signal is applied at read-out of the abovementioned temperature data RD. As a result, the gate signal FULL is released from the low level and the timing circuit 42 begins operating again.

There is one other method of starting measurement in the electronic clinical thermometer of the first embodiment of this invention. This method is to first write measurement-start time data in RAM 44 at, e.g., the "0" address thereof from the external apparatus at the start of measurement. To accomplish this, the cable is temporarily connected to the connector 2 and the dummy data read-out pulse signal SP is transmitted from the external apparatus, thereby incrementing the address counter 45 so that the data address signal ADD thereof becomes the "0" address. Next, the read gate signal RG from the external apparatus is temporarily raised to the high level, whereby the RAM 44 assumes the data-write mode. As a result, the measurement-start time data supplied by the external apparatus becomes effective on the data bus line R/W-D. Furthermore, in order to prevent the writing of temperature data WD from the counter circuit 431 from occurring at this time, it will suffice to use e.g. three state circuits as the output circuitry of the counter circuit 431 and gate the data sampling signal SG through these three state circuits. As a consequence, the output signal line of the temperature data WD will assume a high impedance during the time that the data sampling signal SG is not at the "1" level. Next, when the data-read pulse signal SP for writing the measurement-start time data is sent from the external apparatus, the measurement-start time data is written at the "0" address, the address counter 45 is incremented by the negative-going transition of this data-read pulse signal SP, and the resulting data address signal ADD becomes the "1" address. When the cable is disconnected from the connector 2 at this time, the RAM 44 is held in the data-write mode by the action of the pull-up resistor $R_P$ and the temperature data WD are then written from the "1" address, as set forth above. Thus, it will suffice to prearrange it so that the measurement-start time data are stored at the "0" address when temperature data RD are read out to the external apparatus.

How long this electronic clinical thermometer can be used before the RAM 44 fills up with the temperature data WD can readily be determined. For example, if the data sampling period is one minute and the predetermined value N of the address counter 45 is 3600, then the RAM will become full 12 hours after the start of measurement. Further, the electronic clinical thermometer may be detached from the body surface during the course of a measurement. In addition, if the measurement-start time is known externally, or if the measurement-start time data has already been written in the RAM 44, all of the read-out temperature data RD will be in one-to-one correspondence at the time that each item of temperature WD is sampled. Accordingly, by incorporating this electronic clinical thermometer in a large-scale diagnostic managing system such as in a hospital, it will be possible to employ a large number of these thermometers, which will lend themselves well also in terms of data management.

It is permissible to provide a switching circuit in series with the lithium battery 3, or to provide a signal circuit RS or the like that is capable of externally resetting the contents of the address counter 45 at any desired time. However, the electronic clinical thermometer of the present invention, rather than being provided with too many functions, fully manifests its strengths in terms of its ability to measure temperature simultaneously at a number of points on the human body, its small size, functional simplicity and low cost, or in terms of its system cababilities, namely the ease with which it can be incorporated in a fixed diagnostic management system.

Second Embodiment

Figure 4:
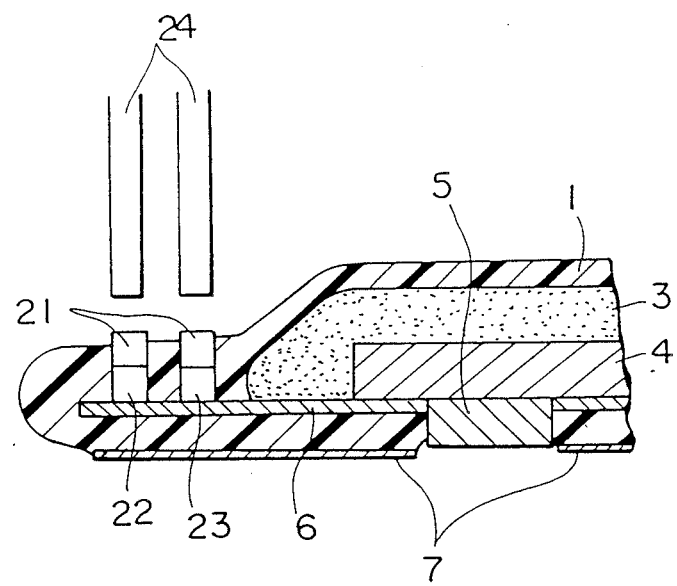
FIG. 4 is a partial sectional view of an electronic clinical thermometer of a second embodiment according to the present invention.

FIG. 4 is a partial sectional view illustrating an electronic clinical thermometer of a second embodiment according to the present invention. The characterizing feature of the second embodiment resides in that the connector uses data serial communicating means employing optical communication or the like for the purpose of extracting the temperature data at high speed and in safety (i.e., in an electrically insulated state). Portions identical with those shown in FIGS. 1(A) through (C) are designated by like reference characters and a description thereof is deleted. In the partial sectional view of FIG. 4, numeral 21 denotes a transparent glass member through which a light signal is transmitted and which seals the connector portion of the electronic clinical thermometer. Numeral 22 designates a phototransistor (PHTr) which receives the light signal from an external apparatus; 23 a semiconductor light-emitting element (LED) which delivers the light signal to the external apparatus; and 24 an optical fiber cable connecting the electronic clinical thermometer and the external apparatus. By virtue of this arrangement, the electronic clinical thermometer per se is provided with an entirely waterproof structure cooperating with the other waterproof structural portions thereof. As a consequence, the thermometer can be readily and fully disinfected. In addition, the electronic clinical thermometer is such that the connector portion can be made very small, enabling the overall thermometer to be reduced in size. Also, the optical fiber cable can be connected with ease. For example, the temperature data can be read merely by bringing the end portion of the optical fiber cable into contact with the transparent glass member. Accordingly, the operation for accepting temperature data from a large quantity of electronic clinical thermometers is greatly facilitated.

Figure 5:
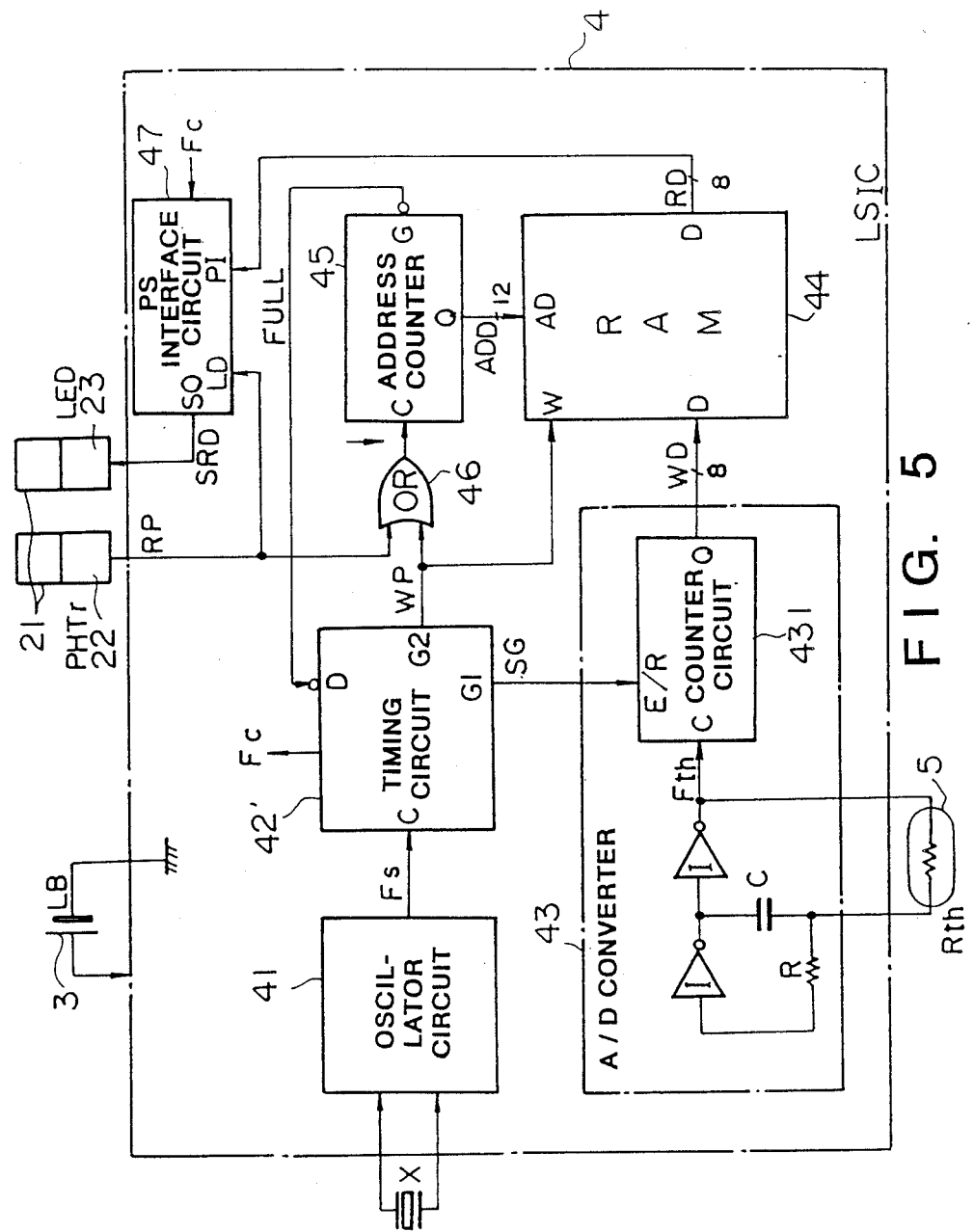
FIG. 5 is a block diagram of the electronic clinical thermometer of the second embodiment according to the present invention.
Figure 6:
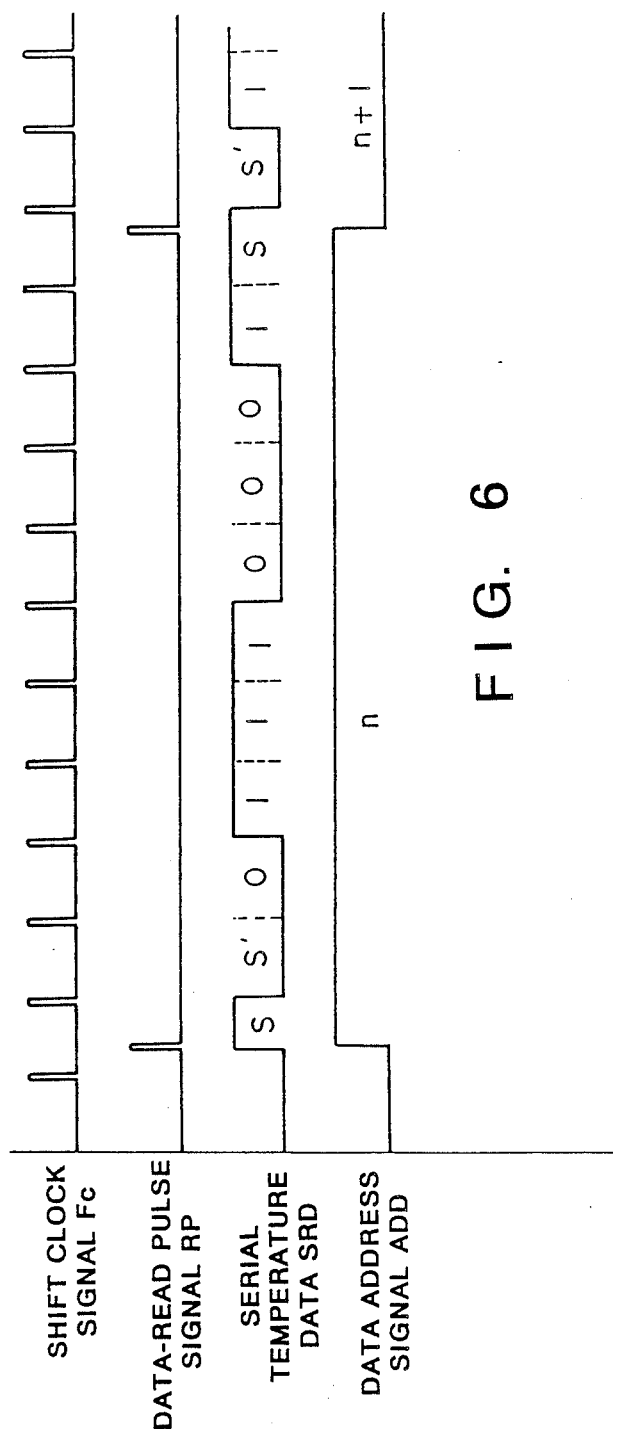
FIG. 6 is an operation timing chart of the electronic clinical thermometer of the second embodiment according to the present invention.

FIG. 5 is a block diagram of the electronic clinical thermometer of the second embodiment according to the invention, and FIG. 6 is a timing chart of the operation thereof. This block diagram differs from that shown in FIG. 2 in that, in order to use an optical communication system for communicating with the external apparatus, eight-bit parallel read-out temperature data RD is converted into serial data by a parallel-serial (PS) interface circuit 47 so that serial temperature data SRD may be outputted to the external unit. To accomplish this, a timing circuit 42' delivers a shift clock signal Fc.

When the data-read pulse signal RP enters from the external apparatus in the operation timing chart of FIG. 6, the read-out temperature data RD from the RAM 44 are latched in the PS interface circuit 47 by the leading edge of the signal RP. The shift clock signal Fc causes the temperature data RD latched in the PS interface circuit 47 to be shifted out sequentially from the MSB or LSB. However, the data-read pulse signal RP and the shift clock signal Fc generally are not in synchronism and, as a consequence, the external apparatus does not know at what point in time the initial serial data bit becomes effective. Accordingly, and by way of example, a start bit S at logical level "1" and an immediately following start bit S' at logical level "0" are always attached to the beginning of each eight-bit item of temperature data as the pattern of the initially appearing serial bit. If this is done, the external apparatus will be capable of recognizing the existence of the start bit pattern by detecting the moment of the initial negative-going transition of the serial data level after delivery of the data-read pulse. As a result, synchronization with subsequent serial temperature data will be achieved. It should be noted that since the data-read pulse RP first transmitted by the external apparatus is a dummy signal (what is read out is, e.g., temperature data at the "N" address, and this data is neglected as temperature data), the external apparatus is capable of achieving initial synchronization by a response from the electronic clinical thermometer to this dummy signal. Thereafter, it will also be possible for the external apparatus to send the data-read pulse signal RP in a form substantially synchronized to the predetermined shift clock signal $F_c$.

Third Embodiment

FIG. 7(A) is an external perspective view showing an electronic clinical thermometer of a third embodiment according to the invention. The third embodiment is characterized in that a flexible temperature sensing probe, in which the chip thermistor 105 is accommodated, and the electronic circuit portion, which is for measuring temperature and storing the detected temperature data, are separately constructed. In the external viw of FIG. 7(A), numeral 101 denotes a temperature sensing probe in which a chip thermistor 105 is accommodated in a flexible, heat-insulative mounting member. Numeral 102 denotes a connector through which temperature data stored by the electronic clinical thermometer are taken out to another external apparatus; 103 a lithium battery serving as a power supply; and 104 an electronic circuit board on which a single chip-type LSIC having the above-described temperature measuring and temperature data storing functions is mounted.

FIG. 7(B) is a sectional view showing the temperature sensing probe of FIG. 7(A). In FIG.7(B), the temperature-responsive portion of the chip thermistor 105 senses body temperature by being brought into contact with the body surface through an aperture 107 provided substantially at the central portion of a skin-contact surface 108. At this time the heat-insulative mounting member 106 makes it possible to accurately measure the temperature of the body surface while it effectively insulates the chip thermistor 105 from the temperature outside.

Thus, the electronic clinical thermometer of the third embodiment is such that at least the temperature sensing probe 101, which is the temperature sensing portion, has a flexible structure which adapts itself to any part of the body surface. As a result, body temperature or body surface temperature can be measured automatically with ease and reliability over an extended period of time.

Fourth Embodiment

Figure 8:
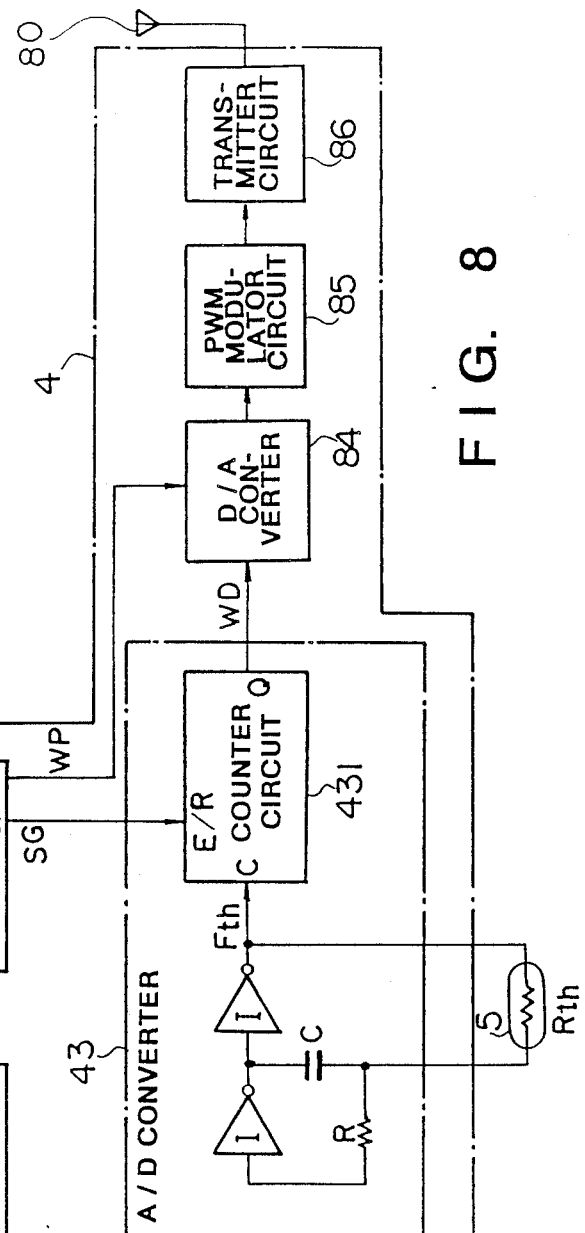
FIG. 8 is a block diagram of an electronic clinical thermometer of a fourth embodiment according to the present invention.

FIG. 8 is a block diagram showing an electronic clinical thermometer of a fourth embodiment according to the invention. The fourth embodiment is characterized in that the temperature data are transmitted directly to the external apparatus by radio waves. Portions identical with those shown in FIG. 2 are designated by like reference characters. In the block diagram of FIG. 8, numeral 84 denotes a D/A converter for converting digital temperature data WD into an analog signal. The conversion timing is decided by the data-write pulse WP generated by the timing circuit 42. Numeral 85 designates a PWM converter circuit for pulse-width converting a carrier-wave signal on the basis of the D/A-converted analog temperature signal. Numeral 86 denotes a transmitter circuit for amplifying the pulse-width modulated signal and then broadcasting it to a receiving station from an antenna 80.

Figure 9:
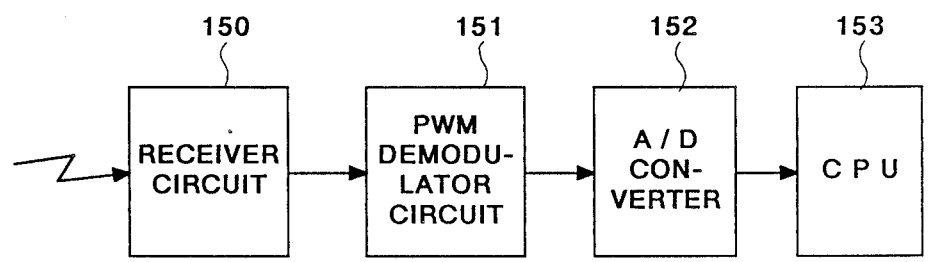
FIG. 9 is a block diagram illustrating an example of the construction of an external apparatus at a receiving station.

FIG. 9 is a block diagram illustrating an example of the construction of the external apparatus in the receiving station. In FIG. 9, radio waves carrying information which is the measured temperature data transmitted by the electronic clinical thermometer are received by a receiver circuit 150. Next, after the output of the receiver circuit is demodulated into an analog temperature signal by a PWM demodulator circuit 151, the signal is converted into digital temperature data by an A/D converter 152 and then accepted by a CPU 153.

Thus, the electronic clinical thermometer of the fourth embodiment is such that data indicative of sensed temperature are delivered in realtime. This means that monitoring of raw temperature and management of data are performed at the receiving station.

Thus, the electronic clinical thermometer of the present invention as described above possesses flexibility which allows the thermometer to adapt itself to any part of a body being measured. This greatly increases the parts of the body at which temperature is capable of being measured.

Furthermore, the electronic clinical thermometer according to the invention is capable of being affixed to any part being measured by affixing means such as double-sided tape. This makes it possible to measure body temperature, under ordinary living conditions, at body parts that could only be measured at bedside in the prior art.

The electronic clinical thermometer according to the invention has an internal function for storing temperature data. As a result, the individual whose temperature is being measured is not subjected to needless psychological stress, thus making it possible to measure normal body temperature that is closer to the true value.

In accordance with the foregoing, the electronic clinical thermometer is not only applicable to health management but the application thereof can be broadened to include other fields, such as the field of psychology.

What is claimed is:

1. An electronic clinical thermometer for making temperature measurement on a body surface, comprising:
    a flexible substrate;
    an electronic circuit, mounted on said flexible substrate, including a temperature-responsive element making surface-to-surface contact with said flexible substrate and a signal extracting portion having signal pins;
    a flexible, heat-insulative covering member for surrounding said electronic circuit and said flexible substrate except for one surface of said temperature-responsive element and the signal pins of said signal extracting portion and for sealing remaining elements of said electronic clinical thermometer from ambient air; and
    adhesive means, peripherally extending from said temperature-responsive element on an outer surface of said covering member, for maintaining contact and position between the one surface of said temperature-responsive element and the body surface.

2. An electronic clinical thermometer, comprising:
    a flexible substrate;
    an electronic circuit mounted on said flexible substrate, including
        a temperature-responsive element making surface-to-surface contact with said flexible substrate;
        a signal extracting portion having a signaling port;
        temperature sensing means for sensing temperature from change in status of said temperature-responsive element;
        a memory for storing a plurality of temperature data at addresses from zero to N;
        counter means for cyclically addressing said memory from a zero address to an N address;
        measurement control means for detecting temperature at a predetermined period by said temperature sensing means, successively storing the temperature data in said memory, and stopping storing of the temperature data in response to designation of the N address by said counter means; and
        read-out means for successively outputting the temperature data in said memory via the signaling port of said signal extracting portion; and
    a flexible, heat-insulative covering member for surrounding said electronic circuit and said flexible substrate except for one surface of said temperature-responsive element and the signaling port of said signal extracting portion and for sealing remaining elements of said electronic clinical thermometer from ambient air.

3. An electronic clinical thermometer according to claim 2, wherein the signal extracting portion includes a light signal transmitting member for transmitting the temperature data and the read-out signal to and form the signaling port.

4. An electronic clinical thermometer according to claim 2, wherein the signal extracting portion includes means for transmitting and receiving the temperature data and the read-out signal as radio signals.

5. An electronic clinical thermometer according to claim 2, wherein said covering member has an outer surface provided with affixing means for affixing the electronic clinical thermometer to a body surface for temperature measurement of the body surface.

6. An electronic clinical thermometer according to claim 2, further comprising writing means for receiving a write signal and time data from the signal extracting portion and for writing the time data in a single predetermined address of the memory for each sequence of temperature measurements.

* * * * *